United States Patent
Akselrod et al.

(10) Patent No.: US 6,316,782 B1
(45) Date of Patent: Nov. 13, 2001

(54) SYSTEM AND METHOD FOR THE DETECTION OF ABNORMAL RADIATION EXPOSURES USING PULSED OPTICALLY STIMULATED LUMINESCENCE

(75) Inventors: Mark S. Akselrod; Stephen W. S. McKeever, both of Stillwater, OK (US)

(73) Assignee: The Board of Regents for Oklahoma State University, Stillwater, OK (US)

(*) Notice: Subject to any disclaimer, the term of this patent is extended or adjusted under 35 U.S.C. 154(b) by 0 days.

(21) Appl. No.: 09/329,136

(22) Filed: Jun. 9, 1999

Related U.S. Application Data

(60) Provisional application No. 60/089,500, filed on Jun. 19, 1998.

(51) Int. Cl.$^7$ .................................................. G03B 42/02
(52) U.S. Cl. ........................................ 250/582; 250/497.1
(58) Field of Search ............................. 250/582, 497.1, 250/252.1, 581, 484.5, 459.1

(56) References Cited

U.S. PATENT DOCUMENTS

| | | |
|---|---|---|
| 3,859,527 | 1/1975 | Luckey . |
| 3,975,637 | 8/1976 | Ikedo et al. . |
| 4,258,264 | 3/1981 | Kotera et al. . |
| 4,315,318 | 2/1982 | Kato et al. . |
| 4,517,463 | 5/1985 | Gasiot et al. . |
| 5,063,298 | * 11/1991 | Freitas, Jr. et al. ............... 250/497.1 |
| 5,420,441 | * 5/1995 | Newman et al. .................... 250/581 |
| 5,591,968 | * 1/1997 | Grillet .............................. 250/252.1 |
| 5,892,234 | 4/1999 | McKeever et al. . |
| 5,962,857 | 10/1999 | McKeever et al. . |

FOREIGN PATENT DOCUMENTS

3430597A1   2/1986   (DE) .

\* cited by examiner

*Primary Examiner*—Robert H. Kim
*Assistant Examiner*—Irakli Kiknadze
(74) *Attorney, Agent, or Firm*—Fellers, Snider, Blankenship, Bailey & Tippens, P.C.

(57) ABSTRACT

This invention relates generally to luminescence techniques for imaging radiation fields and, more specifically, to the use of experimental and mathematical methods to distinguish between dynamic irradiation and static—or other abnormal radiation—exposure conditions for applications in personnel and environ mental radiation dosimetry, or related fields. In more particular, the instant invention provides a rapid and reliable method of detecting abnormal dosimeter exposure conditions over a wide dynamic range of radiation doses, while avoiding significant background interference and stimulation light leakage. Additionally, the preferred embodiment of the instant invention uses a pulsed and synchronized luminescence detection scheme. Further, this invention teaches a complete method and system for abnormal exposure detection—including the use of a luminescent thin powder layer, the use of a periodic radiation absorbing filter, the pulsed stimulation and synchronized luminescence detection scheme, and the method of analyzing and interpreting the recorded images. Finally, the system provides a means of mathematically characterizing an image as containing either a normal or abnormal exposure.

25 Claims, 11 Drawing Sheets

(5 of 11 Drawing Sheet(s) Filed in Color)

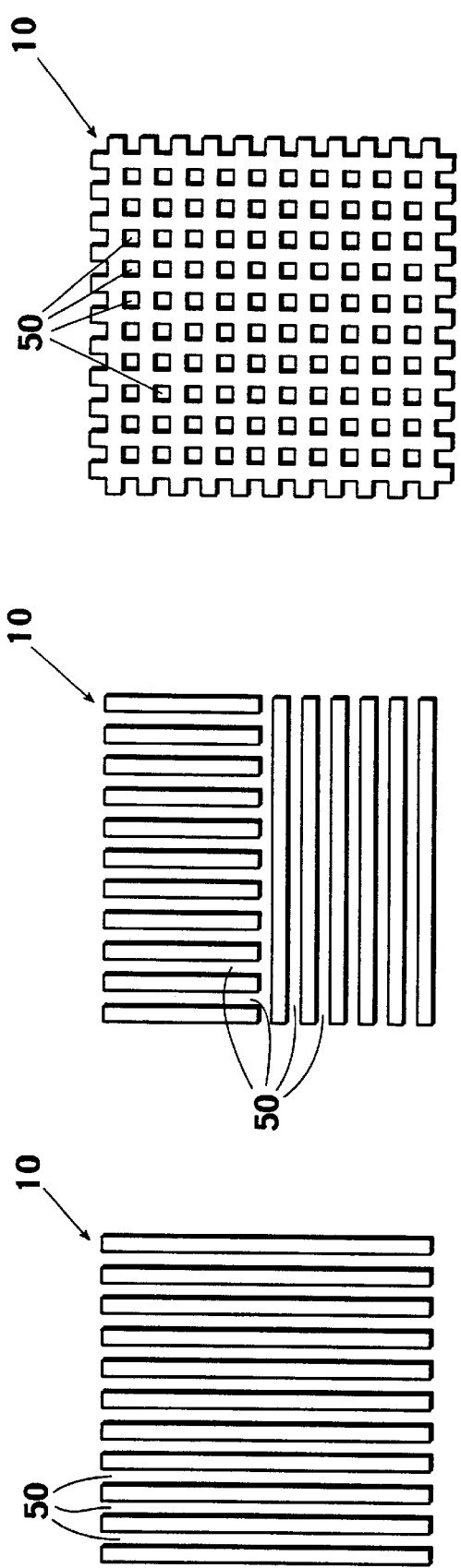
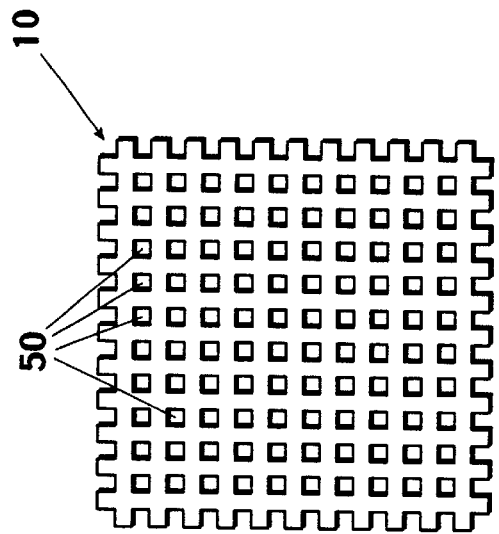
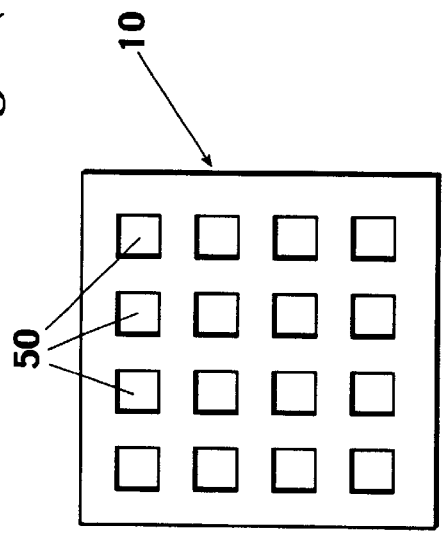
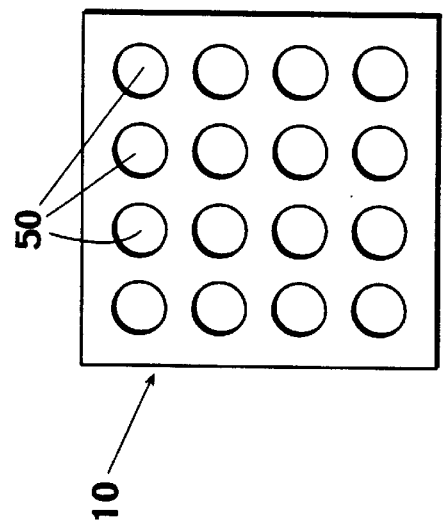
Fig. 2(A)
Fig. 2(B)
Fig. 2(C)
Fig. 2(D)
Fig. 2(E)

SYSTEM AND METHOD FOR THE DETECTION OF ABNORMAL RADIATION EXPOSURES USING PULSED OPTICALLY STIMULATED LUMINESCENCE

RELATED APPLICATIONS AND CLAIM OF PRIORITY

The instant application is related to copending U.S. patent application Ser. Nos. 08/710,780 and 08/879,385, the disclosures of which are incorporated herein by reference. Additionally, the instant application claims priority based on U.S. Provisional Patent Application No. 60/089,500, filed on Jun. 16, 1998, the disclosure of which is incorporated herein by reference.

TECHNICAL FIELD

This invention relates generally to luminescence techniques for imaging radiation fields and, more specifically, to the use of experimental and mathematical methods to distinguish between static and dynamic irradiation and other, related, abnormal radiation exposure conditions. The instant invention would be most fully appreciated by those in the personnel and environmental radiation dosimetry fields, and to fields related thereto.

BACKGROUND

Current radiation dosimetry methods using photographic film take advantage of the imaging capabilities of the film to map a "radiation image". This is done by inserting radiation absorbing filters between the source of the radiation and the film. When the film is subsequently developed an image of the filters is obtained. This capability is used in the radiation dosimetry community to detect abnormal exposure conditions. The main abnormal exposure condition of interest is the intentional, or accidental, exposure of the film to a radiation source when the radiation film "badge" is not being worn by a person. This might occur, by way of example, if someone placed his or her radiation film badge close to a radiation source in order to expose the badge—but not the person—to the radiation. Such "static" exposures of the badge will produce a sharp image of the filters on the developed film. This is to be distinguished from an exposure in which a person wears the film badge on his or her clothing over an extended period. The images of the radiation absorbing filters in this "dynamic" case are expected to be blurred. By subjectively distinguishing between "sharp" and "blurred" a judgment can be made regarding the likelihood of "static" exposure and, specifically, to distinguish between "static" exposure and the more usual "dynamic" exposure.

Other potential abnormal exposure conditions include the unintentional shielding of the film by external objects (coins, paper-clips, etc.) because the badge was worn incorrectly (say) in a person's pocket, rather than being worn correctly on the outside of a person's clothing. Such exposures are normally detected by observing an image of the object on the developed film. Still other abnormal exposure conditions include contamination of the film badge by radioactive contaminants, or physical damage of the film or the radiation filter. Such conditions typically exhibit "hot spots" or "cold spots" on the developed film.

Others have investigated the imaging of radiation exposure of large area phosphors using optically stimulated luminescence, see, for example, Luckey (U.S. Pat. No. 3,859,527), Ikedo et al. (U.S. Pat. No. 3,957,637), Kotera et al. (U.S. Pat. No. 4,258,264), Kato et al. (U.S. Pat. No. 4,315,318) and Gasiot et al. (U.S. Pat. No. 4,517,463). These references are cited more fully in the attached Bibliography, references (1) to (5) of which are specifically incorporated herein by reference. However, the field of application of each of these patents is medical imaging and the goal in each case is to capture an image of an irradiated object, such as a human body, on a luminescent plate. The latent image on the plate is typically read by scanning with a suitable laser beam. In particular, Luckey (U.S. Pat. No. 3,859,527) records the radiation image by exposing the phosphor to radiation through the object to be imaged, then reading the recorded information by stimulating the phosphor by scanning with a laser beam. The image is read by recording the output of a photodetector as a function of the position of the scanning laser beam on the surface of the phosphor.

Note that the foregoing inventors have focused their efforts on imaging an object, rather than on the problem under consideration herein; namely, the detection of non-standard irradiation of a phosphor sample. Furthermore, the imaging methods published previously do not use the pulsed, synchronized detection techniques described hereinafter.

Heretofore, as is well known in the radiation dosimetry arts, there has been a need for an invention that can provide rapid and reliable detection of abnormal dosimeter exposure conditions over a wide dynamic range of radiation doses (~1 mGy to ~100 Gy) without encountering significant background interference or stimulation light leakage. Additionally, the invention should preferably use a pulsed and synchronized luminescence detection scheme. Further, the invention should provide a complete method and system for abnormal exposure detection including the use of a luminescent thin powder layer, the use of a periodic radiation absorbing filter, the pulsed stimulation and synchronized luminescence detection scheme, and a method of analyzing and interpreting the recorded images. Finally, the system should provide some means of mathematically characterizing an image as containing either a normal or abnormal exposure.

Accordingly, it should now be recognized, as was recognized by the instant inventors, that there exists, and has existed for some time, a very real need for a method and apparatus that would address and solve the above-described problems. Before proceeding to a description of the instant invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to one aspect of the instant invention, there is provided a method and apparatus for distinguishing between static and dynamic dosimeter exposure conditions, wherein Pulsed Optically Stimulated Luminescence (POSL) is applied to a luminescent material preferably containing aluminum oxide, carbon, and other essential elements, to assess the character of absorbed radiation doses. By way of general background, the technology associated with POSL is more fully described in co-pending patent application Ser. Nos. 08/710,780 and 08/879,385. In the instant invention, a luminescence detector, consisting of a thin layer of luminescent powder deposited on a suitable substrate, or sandwiched between thin films of (say) plastic, is placed under a radiation-absorbing filter, the filter having a spatially periodic structure with areas of higher radiation absorption coefficient and areas of lower, or zero, radiation absorption coefficient. Alternatively, two filters might be used—one positioned on either side of the luminescent powder—with each having spatially periodic absorption characteristics. A two-filter configuration would make the response of the dosimeter indifferent to its orientation—it would not have a "front" side or a "back" side. The detector and filter(s) are then typically made part of a badge or other device for measuring radiation exposure and sent to the field.

Upon its return from the field, the badge and its associated detector are preferably tested for exposure to radiation as follows. The luminescent layer is placed in the path of a beam of stimulating light in such a way as to uniformly, or nearly so, illuminate the whole of the area of interest of the luminescent layer. The stimulating light is preferably pulsed at a predetermined frequency, and the luminescence emitted from the luminescent layer is detected by an imaging system, such as a camera using a charge coupled device (CCD). The light detection is synchronized to occur between the pulsed laser stimulations and the image recorded by the camera is a representation of the pattern of luminescence emission from the luminescent layer, which in turn is a representation of the pattern of radiation absorption a s defined by the structure of the radiation absorbing filter.

The distinction between "static" and "dynamic" irradiation is then made by observation and/or analysis of the luminescent image so-recorded. In one preferred embodiment, a spatial frequency spectral analysis of the image intensities from the luminescent image is calculated and the resulting values are analyzed. Depending on the resulting numerical values, an image will be classified as either normal or abnormal—dynamic or static.

In brief, it is a goal of this invention to arrive at a rapid and reliable method of distinguishing between "static" and "dynamic" irradiation, while at the same time providing the means to detect other abnormal radiation exposures as listed above.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction, or to the arrangements of the components, or to the specific steps of the computational processes set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

The file of this patent contains at least one drawing executed in color.

Copies of this patent with color drawing(s) will be provided by the Patent and Trademark Office upon request and payment of the necessary fee.

FIGS. 2A–2E contains some examples of spatially periodic filter patterns: (A) stripes; (B) orthogonal stripes; (C) woven wire square holes; (D) 2-D array of circular holes; (E) 2-D array of square holes.

DETAILED DESCRIPTION OF THE PREFERRED EMBODIMENT

Before explaining the instant invention in detail, it should be noted and understood that the invention is not limited in its application to the details of the construction and the steps illustrated herein. The invention is capable of other embodiments and of being practiced or carried out in a variety of ways. It is to be understood that the phraseology and terminology employed herein is for the purpose of description and not of limitation.

The invention taught herein may be broadly viewed in terms of three embodiments: dosimeter preparation, sample imaging, and subsequent analysis of the imaged sample. Each will be discussed separately below.

DOSIMETER PREPARATION

Figure 1:
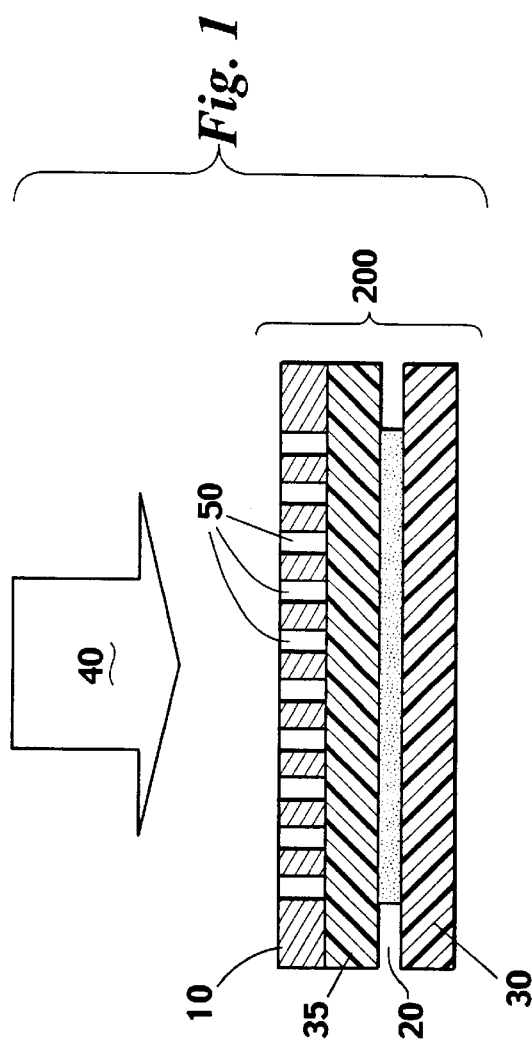
FIG. 1 illustrates the irradiation of an assembled dosimeter having a spatially periodic radiation-absorbing filter.

As is illustrated in FIG. 1, the preferred dosimeter 200 is constructed as follows. As a first step, a thin layer 20 of luminescent powder is deposited onto a suitable substrate 30—or sandwiched between suitable upper and lower retaining members 30 and 35—and a radiation absorbing filter 10 is placed in front of, and in close proximity to, the luminescent layer 20 (FIG. 1). The luminescent powder is preferably made up of three or more chemical elements (i.e., it is a "multi-element" material) and possess "lattice defects" that act as storage centers for the latent absorbed radiation dose image. In the preferred embodiment, anion-deficient aluminum oxide, with carbon in solid solution, is used as the tri-element (Al, O, and C) luminescent material. The luminescent center active in OSL from $Al_2O_3$:C is an oxygen vacancy trapping two electrons. Crystalline anion-deficient aluminum oxide with a third element (C) in solid solution has an oxygen-vacancy concentration of about $10^{16}$–$10^{18}$ $cm^{-3}$, which gives rise to a measured optical absorption coefficient of 1–100 $cm^{-1}$ at 205 nm.

For purposes of POSL imaging, the luminescent material should have a relatively long-lived "prompt" luminescence (i.e. microseconds to tens of milliseconds), as described in the related patent applications named previously. The stored image should have a lifetime at least sufficient for removing the luminescent material from the radiation field and transporting it to the measurement system without significant loss of the stored information. The luminescent material should also have radiation-induced optical absorption within the wavelength range of the optical stimulation. In the preferred embodiment and using the preferred materials, the lifetime of the luminescence from the oxygen vacancy centers (called F-centers) in $Al_2O_3$:C is approximately 35–36 ms, and the peak of the luminescence emission at room temperature is approximately 420 nm. F-centers occur in $Al_2O_3$:C in concentrations of about $10^{16}$ to $10^{18}$ cm$^{-3}$ and exhibit optical absorption at about 205 nm. A wide stimulation band exists in irradiated $Al_2O_3$:C, over a range concentrations of about $10^{15}$–$10^{17}$ cm$^{-3}$, giving an optical absorption band centered near 255 nm.

That being said, other luminescent materials could certainly be used in the alternative and, in fact, the method of synthesis of the luminescent material, the method of preparation of the luminescent layer 20, and the method of fixing the layer to a substrate or between thin films 30 are not critical aspects of this invention. The instant invention can be practiced in many other ways using a variety of different dosimeter materials and detector designs 200. However, the dosimeter 200 described previously is a preferred model for use with the instant invention.

In the preferred embodiment, the filter element 10 of the instant invention contains a pattern of apertures 50 therethrough. The material of the filter 10 is preferably one that efficiently absorbs incident radiation 40, so that the regions of the luminescent layer 20 not covered by the filter 10 experience greater radiation exposure than those that are covered.

The pattern of exposure of the luminescent layer 20 is, thus, dictated by the particular pattern chosen for the radiation filter 10. More generally, the filter 10 need not contain apertures 50, but instead might have areas of higher radiation absorption coefficient and areas of lower, or zero, radiation absorption coefficient. In either case, the same effect is sought: some regions of luminescent layer 20 receive greater radiation exposure than others, and the pattern of exposure is controlled by the filter 10. Additionally, spatially periodic 2-D patterns may be created by using a pattern of woven wires (e.g., FIG. 2(C)), alternating strips of material (e.g., FIGS. 2(A) and 2(B)), etc.

It is possible that in some cases two filters 10 would be employed: one positioned on either side of the luminescent layer 20. One advantage of this arrangement is that a dosimeter 200 having luminescent layer 20 within such a "sandwich" would not have a preferred orientation (i.e., it would not have a "front" or "back"), but rather would function equally well no matter which way it was facing with respect to the incident radiation.

It is an important aspect of this invention that the pattern of radiation transmitting regions in the filter 10 be of known spatial periodicity. This periodicity might be either one-dimensional (i.e., "1-D") or two-dimensional ("2-D"), with the preferred embodiment using a 2-D pattern. FIG. 2 contains some illustrative examples of suitable filter patterns, the "solid" areas in each pattern being relatively opaque to incident radiation. Some examples of 1-D patterns include an array of stripes (FIG. 2(A)), or a linear array of holes (square, rectangular or circular). Examples of 2-D spatial patterns include a 2-D array of square (FIGS. 2(C) and 2(E)), rectangular or circular (FIG. 2(D)) holes. It should be obvious that the examples given herein are for purposes of illustration only and many other spatial arrangements are certainly possible. Additionally, it should be noted that the term "holes" should be broadly construed to also include solid areas in the filter that are more radiation-transmissive than the remainder of the filter, so as to produce a radiation exposure contrast between the "filtered" and "unfiltered" parts of the luminescent layer 20. Finally, the term "spatially periodic" will be used hereinafter to describe any 1-D or 2-D repeating pattern of low or high radiation-transmissive areas.

The filter 10 should be thin enough to minimize shadow formation, but thick enough to provide efficient radiation absorption. Suitable filter materials includes metals, such as gold, brass, copper, stainless steel, lead, etc., as well as certain plastics, ceramics, and composite materials. In short, any material which can be made relatively opaque to irradiation might potentially be used. Other design parameters for efficient operation of the system include optimization of the distance between the filter 10 and the luminescent layer 20. The optimal distance for a given filter will depend upon the filter thickness and the filter material, with the exact dimensions being determined largely by trial and error.

RADIATION EXPOSURE MEASUREMENT

Figure 4:
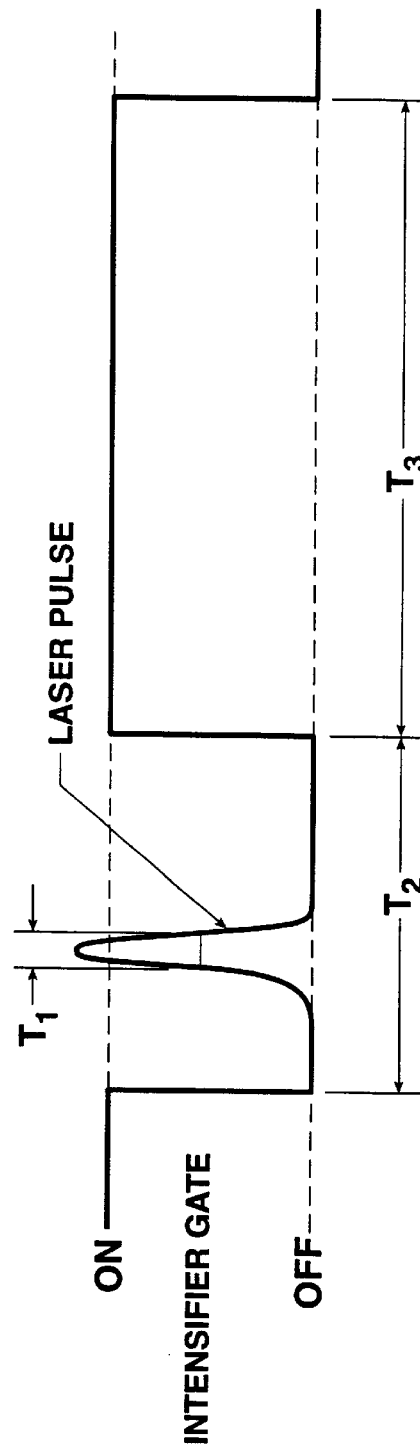
FIG. 4 contains a timing diagram that illustrates how synchronization is used during data acquisition.

After the dosimeter 200 has been returned from the field, it must be tested to determine the amount, nature, and distribution of the radiation to which it has been exposed. As is broadly illustrated in FIG. 3, the irradiated badge or other dosimeter 200 is tested to determine the amount and distribution of radiation exposure, preferably by stimulating the previously irradiated luminescent layer 20 with a stream of light pulses that are designed to induce the emission of pulsed optically stimulated luminescence (POSL). By way of general background, POSL uses a series of short pulses of light in the range of wavelengths of radiation-induced optical absorption of the luminescent material to stimulate photon emission by the target sample. OSL is detected only between the individual pulses that comprise the stimulation stream. A key variable in this method is the choice of stimulation pulse width (see the timing diagram in FIG. 4), which should be significantly shorter than the lifetime of the prompt OSL from the luminescent material.

Figure 10:
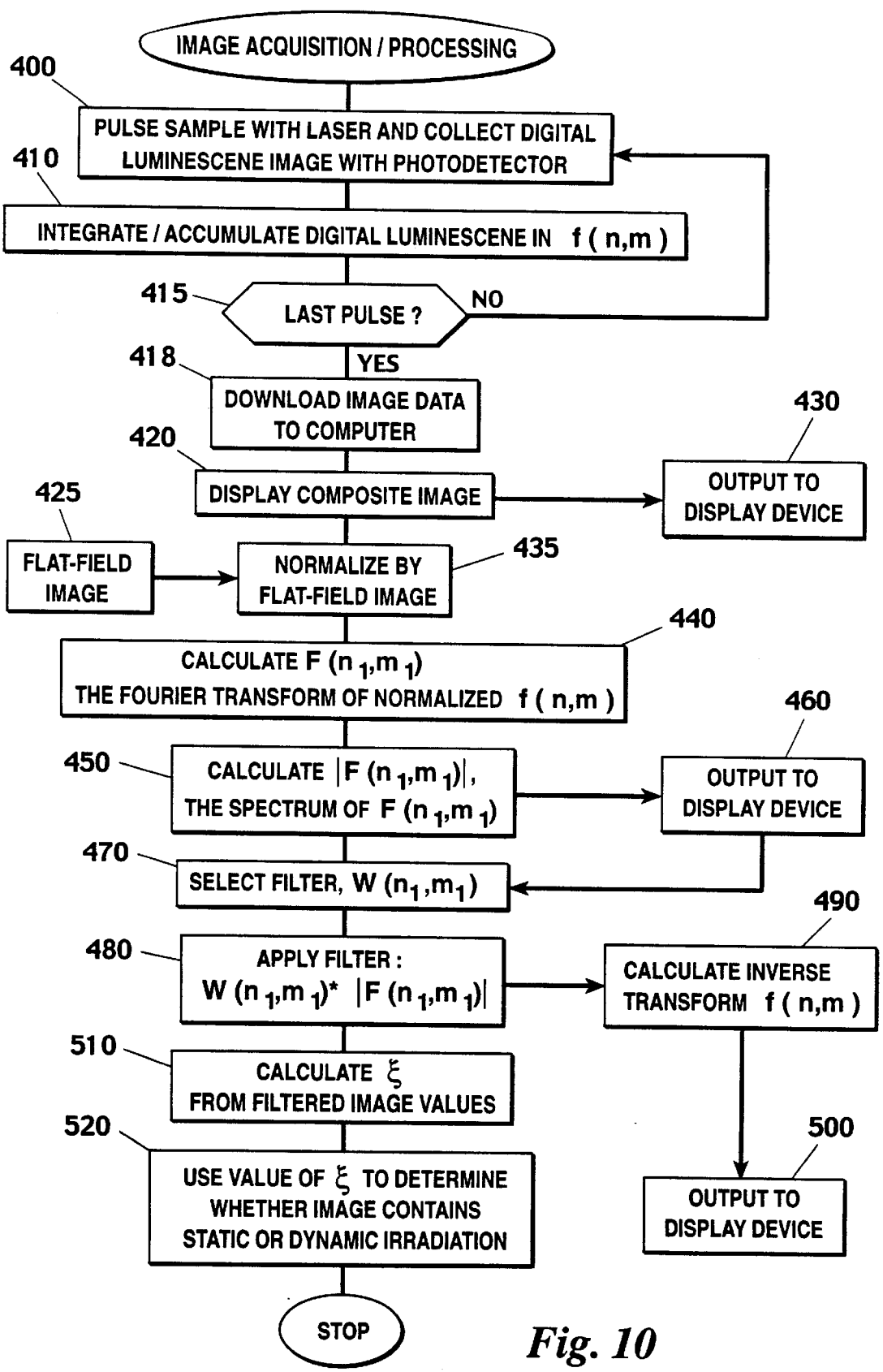
FIG. 10 contains a flowchart that illustrates the principal steps in one preferred embodiment of the instant invention.

Those skilled in the art will recognize that it is important that the power of the stimulation light be low enough to prevent heating of the luminescent material during stimulation. It is also important that the power and wavelength be chosen so as to prevent multi-photon absorption processes from occurring and thereby causing a non-radiation-induced luminescence signal from the material. In light of these concerns, the preferred general approach to dosage measurement (POSL), which is designed to yield high stimulation and detection efficiency and a large signal-to-noise ratio over a wide dynamic range, is illustrated in FIG. 10 and may be summarized as follows:

(a) A large population of excited luminescence centers is induced through the use of an intense pulse of stimulating light (step 400).

(b) This population is kept excited long enough after the cessation of the stimulation pulse to allow the activation (i.e., gating on) of a luminescence imaging detector.

(c) The luminescence emission is imaged only between the stimulation pulses, and no imaging takes place during these pulses.

(d) The detected luminescence from successive stimulation events is integrated by binning (e.g., summing) together (step 410) corresponding image pixel intensities to form a composite image.

(e) The integration is continued over a period of time which is long enough to allow a composite image to be formed which is substantially above the background noise of the detector (step 415).

Of course, in the preferred embodiment the entire data collection process is completely under computer control.

Figure 3:
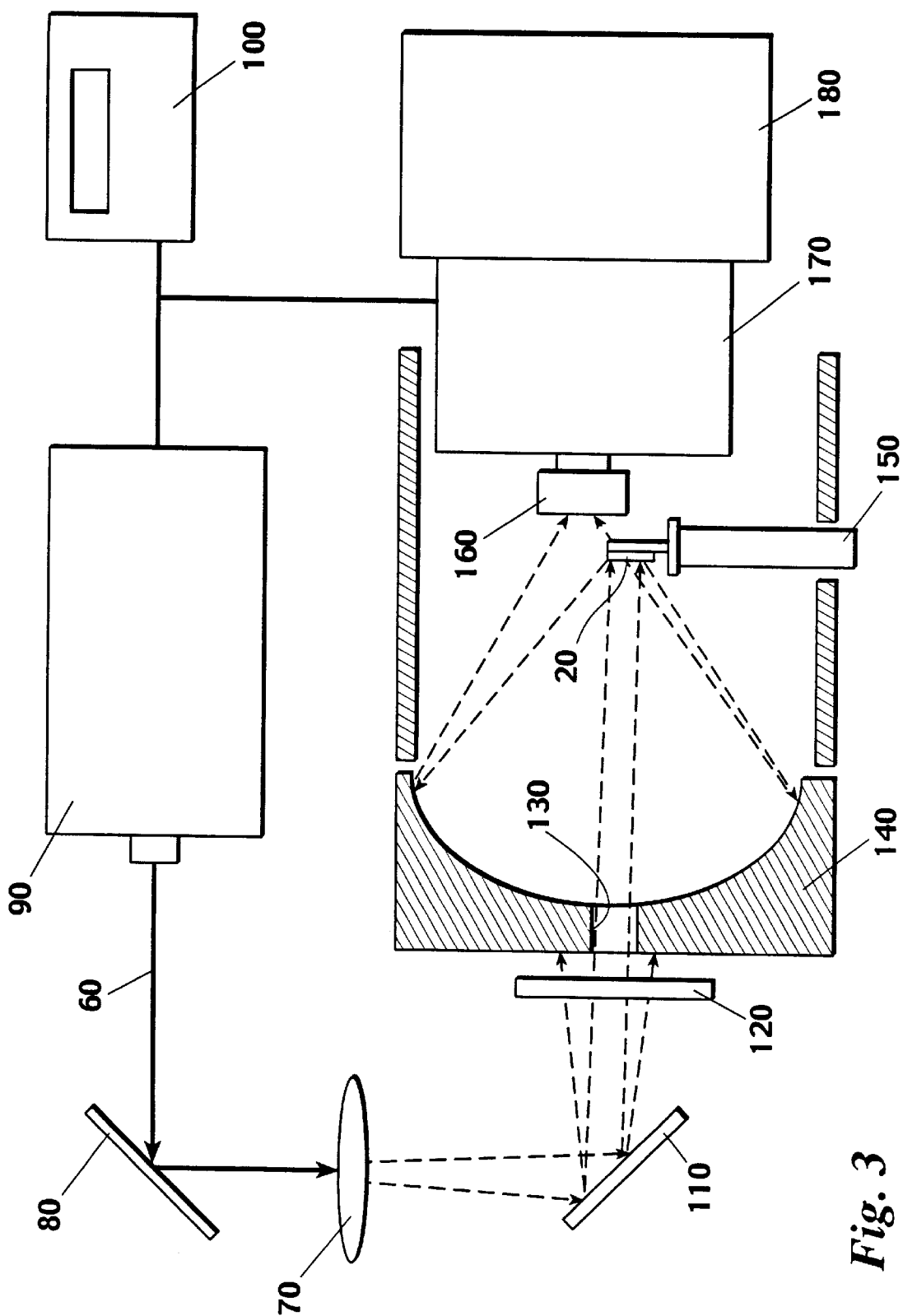
FIG. 3 is a schematic drawing that illustrates the principal components of the image readout system.

Turning now to the hardware components of the preferred imaging system and as is illustrated in FIG. 3, an image representative of the radiation exposure of the dosimeter 200 is obtained by removing the filter element 10 and applying a stimulating beam 60 to the now fully exposed luminescent layer 20. The beam 60 should be spread uniformly, or nearly so, over the whole area of interest of the luminescent layer 20, this result preferably being achieved using defocusing optics and/or beam expanders 70. The resulting images, upon which have been impressed the pattern of the radiation absorbing filter(s) 10, may thereafter be normalized and analyzed, as described hereinafter. By way of example only, one way of normalizing this image is to compare it with the image of a uniformly irradiated luminescent layer (e.g., irradiated without the radiation absorbing filter) illuminated in the same fashion. This approach will be discussed in greater detail below.

In FIG. 3, the illuminating light is preferably a beam 60 from a frequency-doubled Nd:YAG laser 90 with an output at 532 nm, controlled by a pulse generator 100. The particular laser light frequency used is matched to the choice of the luminescent powder in a manner well known to those skilled in the art. Thus, in practice the laser may not be Nd:YAG and the wavelength need not necessarily be 532 nm, depending on the particular choice of the luminescent powder.

The overall number of illumination pulses is also controlled by the pulse generator. Pulse durations of 1–10,000 ns and repetition rates of 1–30,000 Hz are preferred. Mirrors 80 and 110 are used to direct the beam 60 through a defocusing lens and/or beam expander 70 so as to uniformly, or nearly so, expand the beam 60 to cover the surface of the luminescent layer 20. The mirrors 80 and 110 also steer the beam 60 through a filter 120, and through a hole 130 in the center of a concave, front-surface, spherical mirror 140. Filter 120 is preferably a 515 nm low cut filter. The beam 60 is directed slightly off axis onto the luminescent layer held on the sample holder 150 which is placed such that the luminescence from the sample 20 is reflected off the mirror 140 and back through a second filter pack 160 to the image intensifier 170 of a CCD camera 180. The filter pack 160 contains a combination of appropriate notch, dichroic and glass filters to give an acceptable signal-to-background noise ratio. The image intensifier 170 is gated synchronously with the laser beam 60 pulses such that it is switched off during the laser pulse, and is switched on in the period between pulses. The gating of the intensifier is controlled by the pulse generator. The timing of the gating, with respect to the laser pulse, is indicated schematically in FIG. 4. The pulse generator triggers the laser pulse, which has a duration (peak half width) of $T_1$. The laser pulse occurs during the time interval $T_2$, during which time the intensifier is switched off. After a suitable delay, the intensifier gate is switched on and is kept on for a time $T_3$, during which time a digital signal which is spatially representative of the luminescence image is captured. After time $T_3$, it is switched off again for a further period $T_2$, during which time the next laser pulse appears. The pulsing is repeated until the desired number of digital signals have been collected, with signals being preferably continuously summed to provide the final image signal.

The summing operation to produce the final image is preferably performed as follows. During the periods between the pulses (i.e. during periods defined by $T_3$) each pixel on the photodetector, CCD camera 180, accumulates a charge proportional to the pattern of the light intensity incident on the intensifier 170 window. In this way, the charge on an individual pixel is representative of the intensity of light from a specific location on the luminescent layer 20. The signal on each pixel is preferably accumulated (i.e., summed) over the entire period of the measurement to create a composite image at the end of the sequence of pulses. At the close of the measurement cycle, a numerical value representative of the charge on each pixel is downloaded to an attached or networked computer. To extend the dynamic range of data acquisition, several frames may be downloaded to the computer, each frame consisting of the integrated results of an entire series of pulses. The digital image data, in the form of a two-dimensional array of numbers, thus represents the pattern of luminescence emission from the luminescent layer 20—and is thus a representation of the pattern of radiation absorption. This pattern, in turn, is dictated by the spatially periodic, radiation absorbing filter, and the exact conditions of the irradiation—including "static" or "dynamic" irradiation.

CREATING DYNAMICALLY IRRADIATED SAMPLES

Figure 5:
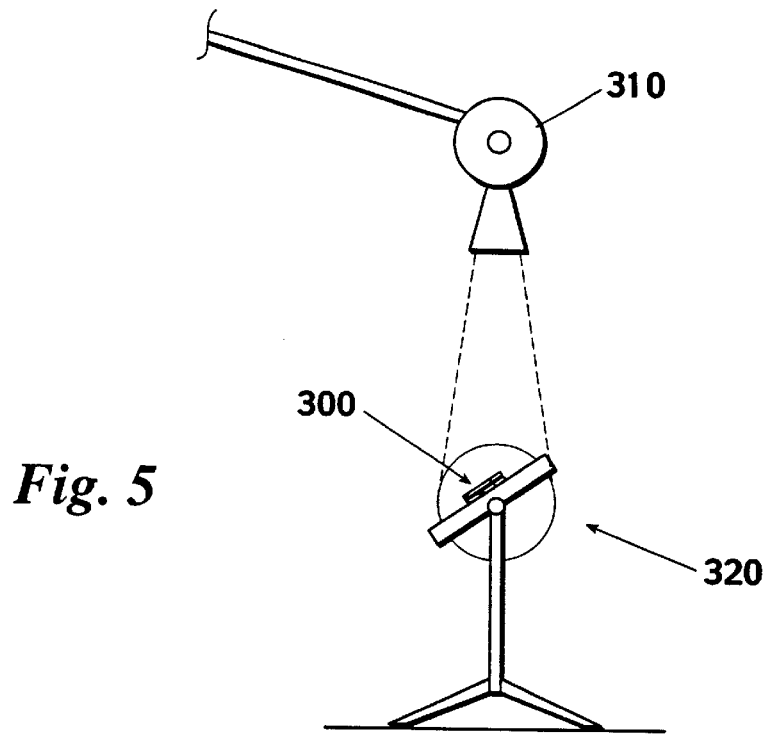
FIG. 5 illustrates the irradiation apparatus showing the rotation stage for irradiation of the sample at pre-determined angles with respect to the incident radiation field.

As is illustrated in FIG. 5, according to another aspect of the instant invention there is provided a device to assist those doing visual or mathematical interpretations of field-irradiated luminescent materials. In more particular, the device of FIG. 5 makes it possible to dynamically irradiate a luminescent material 20 through any choice of filter 10 under controlled laboratory conditions. The images obtained from the luminescent materials 20 in these dynamically irradiated dosimeters 300 represent "known" exposure patterns that can be compared with field sample images to help determine whether or not that particular dosimeter 300 was dynamically irradiated. The apparatus consists of an irradiation source 310, preferably an x-ray source, a rotating sample stage 320, and the dosimeter 300. In application, a dynamically irradiated sample is preferably created by setting the sample stage 320 at a particular angle with respect to the irradiation source 310 and then irradiating the dosimeter 300 for a first period of time. The sample stage 320 is then adjusted so that the incident x-rays fall on the dosimeter 300 at a different angle and the dosimeter 300 is irradiated again. It should be clear to those skilled in the art that if the dosimeter 300 is irradiated from a variety of different angles, the resulting luminescent image will be a synthesized representation of that sort of dynamic irradiation. Of course, different combinations of filters 10 and luminescent materials 20 may be tested using this apparatus, so as to build up a library of known responses to particular filters 10 that can be useful in evaluating field samples. Additionally, in the preferred embodiment, it is also possible to adjust the orientation of the sample stage 320 during irradiation, thereby producing truly dynamic irradiation.

By way of an example of the use of apparatus of FIG. 5, note that a periodic array of square holes, if rotated along an axis parallel to one of the lines of holes during irradiation, will yield an image in which the holes appear to merge into one another, thereby producing a stripe along lines perpendicular to the axis of rotation. (See, for example, FIGS. 10(A) and 10(B)). Such an image pattern clearly reveals that the sample was rotated during exposure and it also reveals the axis of rotation. More complex motion (e.g., simple rotation along multiple axes) will produce a smeared image in which the original modulation pattern can be entirely obscured. Additional examples of the use of this device will be given below.

IMAGE ANALYSIS

According to a preferred embodiment of the instant invention and as is illustrated in FIG. 10, there is provided a method of analysis of digital images arising from POSL—or any other method of imaging radiation fields—that yields a 2-D digital image, wherein static and dynamic radiation exposure may be distinguished. As a first step, the sample is stimulated in such as way as to cause it to emit light at each point with an intensity that is proportional to that point's radiation exposure (step 400). A preferred way of doing this is via POSL as described previously. However, any other method of radiation field imaging that causes light to be emitted—visible, ultraviolet, or infrared light—that is representative of the sample's radiation exposure would serve as well.

In the analysis stage of the instant invention, the digital images captured by the imaging detector are preferably downloaded for display on a computer (steps 418 and 420) and are interpreted as "dynamic," "static"or some other abnormal exposure condition. Since the image contains impressed therein the periodic pattern of the particular radiation-absorbing filter 10 used, together with evidence of the dosimeter's 200 radiation exposure, the preferred method of analysis is to examine the modulation pattern of the captured image and compare that with the modulation pattern of an image obtained with the same filter under static irradiation conditions. Alternatively, the digital image certainly could be examined directly to assess its exposure characteristics (step 460)—and this can and should be done in practice—however, the complexity of the image obtained from these sorts of samples argues for a more systematic approach.

This aspect of the instant invention provides an automated and objective method of determining the relative likelihood that a particular image was produced by static versus dynamic irradiation. The preferred image processing steps operate on a 2-D Discrete Fourier Transform (DFT) calculated from the stored image to arrive at a "shape parameter" the value of which provides an objective assessment of the likelihood of static irradiation. In the preferred embodiment, a Fast Fourier Transform (FFT) is used in the image processing step because of its computational efficiency. However, those skilled in the art will realize than an FFT is just one way of calculating a DFT.

By way of general mathematical background, if $f(x,y)$ is a continuous function that represents the original image intensity $f$ in an xy plane, then it is well known that the two-dimensional (2-D) Fourier Transform, F(u,v), of this function may be written as follows:

$$F(u, v) = \int_{-\infty}^{\infty}\int_{-\infty}^{\infty} f(x, y)\exp\{-j2\pi(ux + vy)\} dx\, dy$$

where "√" is the imaginary number, where u and v are spatial frequencies in the x and y directions, and where the u and v axes correspond to the x and y axes, respectively. If, instead, the image intensity function $f$ is a discrete function, $f(n,m)$ defined on an integer grid, a 2-D Discrete Fourier Transform (DFT) may be calculated instead via the following standard double summation:

$$F(n_1, m_1) = \frac{1}{NM}\sum_{n=0}^{N-1}\sum_{m=0}^{M-1} f(n, m)\exp\left\{-j2\pi\left(\frac{nn_1}{N} + \frac{mm_1}{M}\right)\right\}$$

where N×M is the resolution of the spatial image (step 440).

The DFT is a two-dimensional array of complex numbers that represents the distribution of spatial frequencies in two directions, corresponding to the spatial coordinates x and y. In the usual representation (and as used herein) low frequency components are displayed near the center of the 2-D plot and high frequency components are distributed at the edges. The low frequency components of the DFT tend to represent the gradual variations found in the main POSL-generated (or other-generated) image; whereas the high frequency components are usually a result of pixel noise, sharp contrast features, etc.

Thus, having expressed the image as a DFT, the frequency characteristics of the image can easily be altered by eliminating or attenuating those frequencies not desired. For example, random image noise generally has wide bandwidth, most of which can be filtered from the DFT. Spikes in the original data set are high frequency features and can also usually be easily eliminated. On the other hand, the modulation pattern caused by the chosen filter is a low frequency feature which can and should be retained by an appropriate choice of filter parameters.

As a preferred next step, the Fourier transformed digital data are then displayed on a computer screen using suitable display software (step 460). Interpretation of the data is assisted by employing selected image processing techniques, to be discussed hereinafter. The basic approach, though, is to compare the obtained image with a similar image recorded under controlled conditions. Differences between the control and the test images reveal the conditions of irradiation for the test image.

After viewing the transformed image, a frequency domain filter is specified (step 470). As with all such filters, one goal is to eliminate or attenuate the noise-induced Fourier transform components in the frequency domain and then to calculate the inverse Fourier transform to view the noise-attenuated image (steps 490 and 500). Viewing the transform permits a custom 2-D frequency filter to be designed to match the particular observed spatial frequency distribution for this dosimeter 200, but viewing the image prior to applying the frequency filter is not an essential step. As is well known to those skilled in the art, standard frequency domain filters may be developed for use with particular dosimeter filter 10 patterns, and this will almost certainly be done in practice.

Thus, a reconstruction of the image by inverse Fourier Transform after frequency domain filtering will ideally yield a noise-reduced—but more diffuse—image. The inverse DFT of the frequency domain filtered image is obtained via the following standard formula:

$$g(n, m) = \sum_{n_1=0}^{N-1}\sum_{m_1=0}^{M-1} W(n_1, m_1)F(n_1, m_1)\exp\left\{+j2\pi\left(\frac{nn_1}{N} + \frac{mm_1}{M}\right)\right\},$$

where, g(n,m) is the filtered image, and W($n_1,m_1$) is a weight function that implements the particular spatial filter of choice (step 490). That is, for hard (or "zero-one") filtering, W($n_1,m_1$) will be equal to one if that particular spatial frequency component is to be "kept" and "zero" if that frequency component is to be eliminated. More generally, and is well known to those skilled in the art, $W(n_1,m_1)$ might take any real value—but would preferably be limited to values between zero and one inclusive—and could include spatially dependent tapers or other signal processing devices to improve the quality of the filtered image.

The general rationale behind a high frequency truncation is that such a frequency domain operation will tend to attenuate unwanted random image noise, whereas, low frequency truncation removes the background near-zero frequency (i.e. "dc") components, and other low frequency components that might be caused by slowly-varying spatial nonuniformities in the image. These nonuniformities might be caused, for example, by nonuniformities in the illumination, in the radiation field, and in the detector sensitivity. After the frequency domain filter has been applied, the remaining components of the DFT spectrum typically contain the desired information about the periodicity of the radiation-absorbing filter and the conditions of the irradiation (i.e. static or dynamic).

In the preferred embodiment, though, rather than inverting the filtered spectral values, a numerical value is calculated from them that can be used to identify potential static, or otherwise irregularly irradiated, dosimeters. In practice, dosimeters so identified would then typically be "flagged" for direct visual inspection. The visual inspection might include, for example, examination of the filtered and reconstructed image, or the original image, or both, for signs of unusual irradiation.

This numerical value is defined as follows. Let $\xi$ be a shape parameter which is broadly representative of the width of the truncated frequency distribution. The parameter, $\xi$ is a normalized parameter and is defined as:

$$\xi = \frac{\sum_{n_1=1}^{N} \sum_{m_1=1}^{M} |F(n_1, m_1) W(n_1, m_1)|}{\underset{n_1, m_1}{\text{Max}}\{|F(n_1, m_1) W(n_1, m_1)|\}}$$

where, Max(·) represents the maximum over the indicated range, and $|x|$ represents the complex magnitude of the argument (step 510). Defined in this way, $\xi$ is a general measure of the spatial frequency distribution of the image. Those skilled in the art will recognize that there are many variations of the previous formula that might be employed in practice. For example, rather than normalizing the previous expression by the maximum value of the spectral values, the average value, median, mean, or any other statistical value calculated from the weighted or unweighted spectral values might be used instead. Additionally, the denominator might be replaced with the sum of all of the unweighted spectral values, the squares of the sums of unweighted spectral values, or any other mathematical function of the weighted or unweighted spectral values. As another specific example, the denominator might be the mean value of the high-frequency DFT magnitudes, in which case $\xi$ would more accurately be characterized as a "relative modulation." Finally, although the denominator is preferably calculated from the image spectral values, it is also possible to use numerical values from a "standard" image in that calculation instead. Any of these approaches might prove to be useful in an appropriate setting.

As an optional preprocessing step, the original image may be normalized before calculating the DFT therefrom (step 435). In particular, a "flat-field" correction image (step 425) may be obtained from a luminescent layer 20 of the sort used in the dosimeter 200 by irradiating it without a filter 10, and then recording the subsequent pulsed OSL radiation "image" from this uniformly irradiated sample. In practice, multiple images of this sort from different luminescent layers 20 may be averaged, summed or otherwise combined to yield a composite flat-field image. The intensity values in this image are then preferably divided—pixel by pixel—into the image obtained from the dosimeter luminescent layer 20 (i.e., the "target" image). This flat-field image 20 acts as a kind of experimental "control" and helps stabilize the numerical computations. Those skilled in the art know that pixel-by-pixel division of the two images is just one way that the flat-field image might be used to correct or stabilize the luminescent layer 20 image and other arrangements are certainly possible and have been contemplated by the inventors. For example, any single statistical value calculated from the flat-field pixel values might be added to, subtracted from, multiplied by, or divided into the target image values. Additionally, difference images (e.g., pixel-by-pixel flat-field image minus target image), product images, etc. are also possible and potentially useful. In the text that follows, the target image will said to be normalized by the flat-field image, with the word "normalized" being understood to encompass a variety of mathematical operations.

By way of summary, the preferred steps in the image processing algorithm used in this invention involve the following steps (FIG. 10):

Display the original image in both 2-dimensional and 3-dimensional views (steps 420 and 430)

Calculate the DFT of the image, thereby obtaining Fourier Transform coefficients representative of spatial frequencies in the image and obtain the frequency spectrum by taking the complex magnitudes of the Fourier transform coefficients, step 440.

Filter, or truncate, the DFT image to eliminate high frequency noise (step 480).

Calculate the inverse DFT of the filtered frequency spectrum to reconstruct the (filtered) POSL image for visual analysis (steps 490 and 500).

Numerically analyze the values in the filtered or unfiltered DFT frequency spectrum by evaluating the shape parameter $\xi$ and use that parameter to characterize the image as being static or dynamic (steps 510 and 520).

Additionally, the steps involved in calculating $\xi$ from the DFT are preferably as follows:

Obtain a "flat-field" correction image by irradiating a luminescent layer without a radiation absorbing filter in front of it and record the subsequent pulsed OSL radiation "image" from this uniformly irradiated sample. This is the "flat-field" image. (In practice an average of several similar images may be taken.) (Steps 425 and 435).

Record the pulsed OSL radiation image of interest (i.e., the image from a luminescent sample which has been exposed to radiation with a radiation-absorbing filter in front of it) in the usual manner (steps 400–415).

Divide the radiation image by the flat-field image to produce the normalized image (step 435).

Calculate the DFT of the normalized image (step 440).

Calculate the magnitudes of the DFT transform coefficients, thereby forming a spatial power spectrum (step 450). Display the resulting spectrum if desired (step 460).

Frequency filter the power spectrum by attenuating high frequency noise components (steps 470 and 480).

Frequency filter the power spectrum by attenuating low frequency noise components (steps 470 and 480).

Sum the magnitudes in the filtered power spectrum (step 510).

Divide the calculated sum by the maximum of the magnitudes in the spectrum to obtain $\xi$ (step 510).

The text that follows contains some experimental results that illustrate how the instant invention might be used to detect abnormal exposure in practice. The flexibility of the technique and its potential for use in radiation dosimetry are also discussed further.

EXAMPLE EXPERIMENTS

The example experiments described below are meant to be illustrative of the procedures described previously and should not be construed as being definitive descriptions of the experimental procedures actually employed.

Anion-deficient aluminum oxide, with carbon in solid solution, was chosen as the tri-element (Al, O and C) luminescent material 20. The samples consisted of 15–63 $\mu$m grains of $Al_2O_3$:C single crystal powder deposited between upper and lower plastic retaining members. The exact method of preparation of the samples, including the method of deposition of the luminescent material and the material used for the plastic retaining members, is not discussed herein, as methods for doing this are well known to those skilled in the art. All that is required is that suitable luminescent layers exist to establish a readable and interpretable image.

The stimulation source used in these experiments was a Nd:YAG laser operated in the second harmonic with an output at 532 nm. The parameters chosen for the experiments were a pulse repetition frequency of 4000 Hz and a total stimulation duration of 30 seconds (i.e. 120,000 stimulation pulses). The laser pulse width was 300 ns, with an average energy per pulse not exceeding 1 mJ. Various considerations regarding the choice of laser power for use during POSL measurement are covered in co-pending U.S. patent application Ser. No. 08/879,385, cited previously. The image intensifier on the CCD camera 180 was gated off for a total of 25 $\mu$s starting before the initiation of the laser pulse (i.e., $T_2$ in FIG. 4). The photocathode of the image intensifier 170 was cooled to a temperature of −12° C., and the CCD array was cooled to a temperature of −45° C. during the measurements. Using this arrangement the background noise from unirradiated samples was kept at a minimum.

EXPERIMENT I

A thin layer of $Al_2O_3$:C powder deposited between upper and lower plastic retaining members was exposed to x-rays of a variety of energies and at a variety of doses through a copper radiation filter consisting of a 2-dimensional array of circular perforations (see FIG. 2(D)). The samples were exposed in one of three configurations:

(1) "Static" irradiation in which the sample was held perpendicularly to the radiation field and the total dose was delivered at one time without moving the sample.

(2) "1-directional dynamic" irradiation in which the sample was irradiated in eight segments, for the same total dosage as in configuration (1). During each segment the sample was held at a fixed angle with respect to the radiation field but was rotated about an axis perpendicular to the radiation field between irradiation segments. In total, eight different angles were chosen (10° apart).

(3) "2-directional dynamic" irradiation in which the sample was irradiated in eight segments, for the same total dose as in configuration (1). During each segment the sample was held at a fixed angle with respect to the radiation field but was rotated about two orthogonal axes, each perpendicular to the radiation field. Four of the irradiation segments (20° apart) were for rotation about one of these axes, and the remaining four (also 20° apart) were for rotation about the other axis. In total eight different angles, four each about the two axes, were chosen.

As discussed previously, the irradiation apparatus is shown schematically in FIG. 5 and consists of an x-ray source 310, a rotating sample stage 320, and the dosimeter 300. Thus, the orientation of the sample with respect to the direction of incidence of the radiation can be altered during irradiation if necessary.

After irradiation, the filter 10 is removed from the sample 300 and the luminescent material 20 is transported to the POSL stimulation apparatus for testing. Upon stimulation of the irradiated sample, using the conditions described above and the apparatus and timing scheme illustrated in FIGS. 3 and 4, an image of the pattern of luminescence emitted from the sample is detected by the intensified CCD camera 180 and the digital output stored as a computer file. Output files may be 8-bit, 16-bit, or any other suitable format.

Figure 6A:
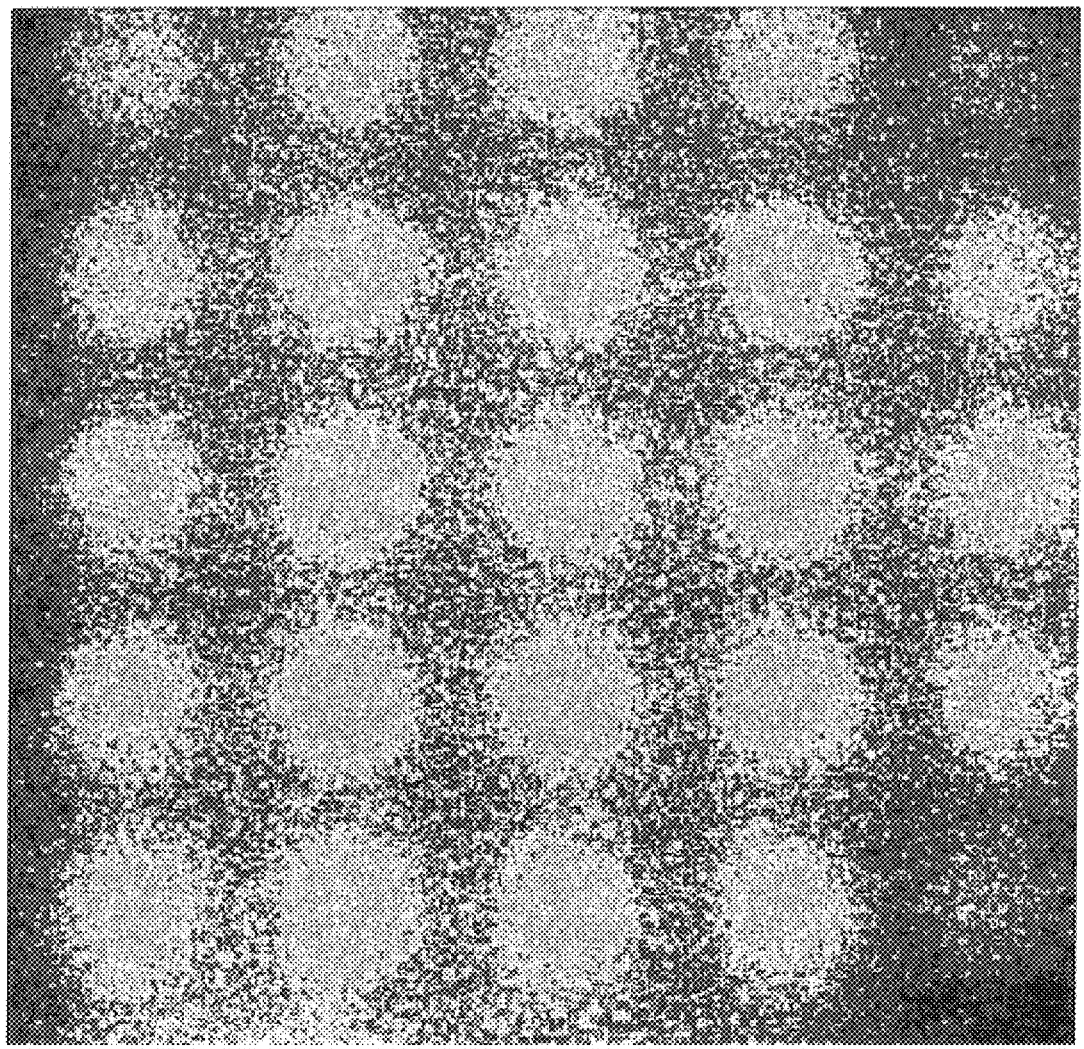
FIG. 6(A) illustrates a luminescence intensity image for a 30 keV x-irradiated sample (at an exposure of 500 mR) with a 1 mm copper filter consisting of a 2-D array of circular holes; and, FIG. 6(B) a 3-D projection of the same image.
Figure 6B:
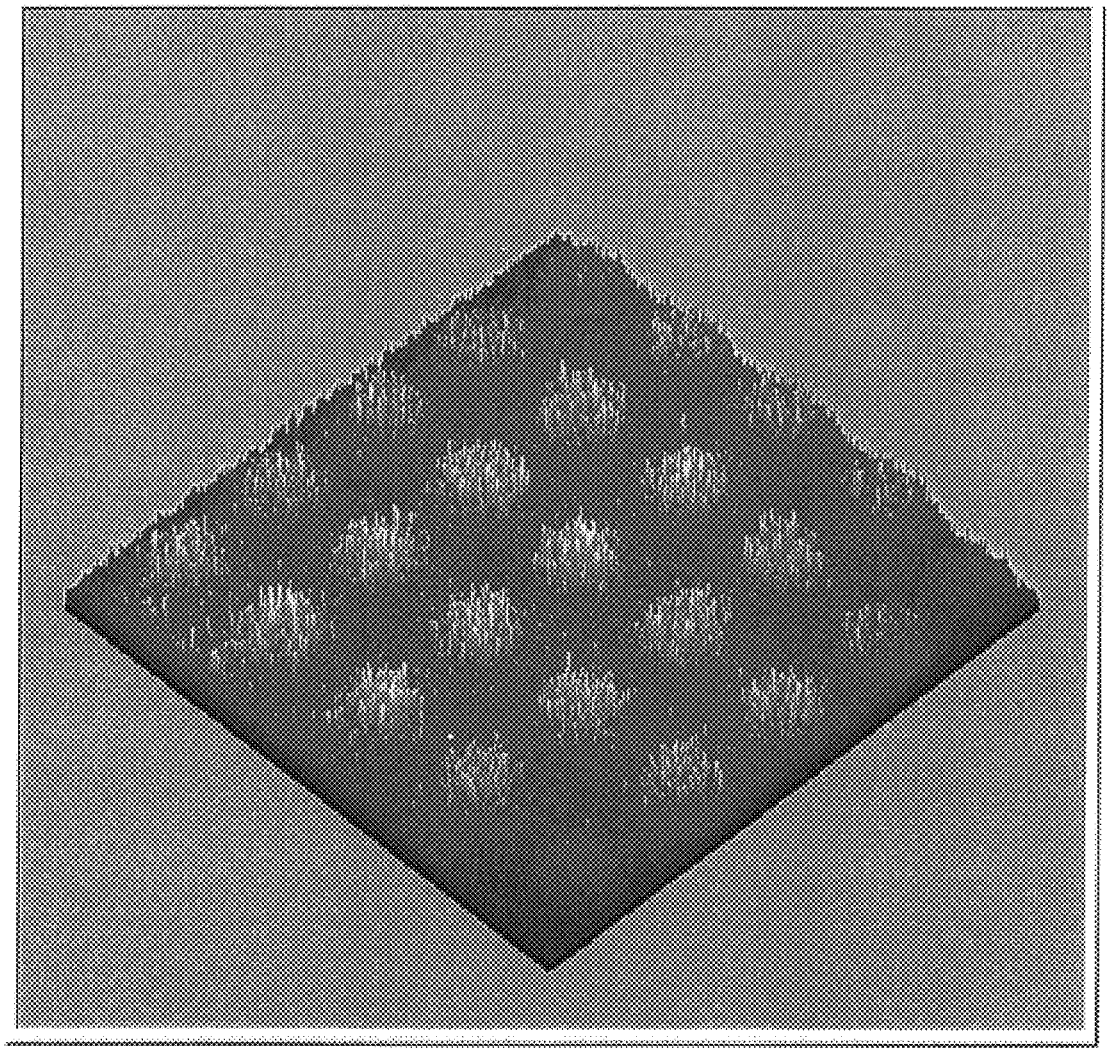

Using conventional computer image display software, an image of the luminescence emission pattern was produced. An example of such as image is shown in FIG. 6(A) for 30 keV x-rays and a dose of 500 mR. FIG. 6(B) shows the same image as a 3-D projection. The sample in this figure was irradiated in a static configuration.

Figure 7A:
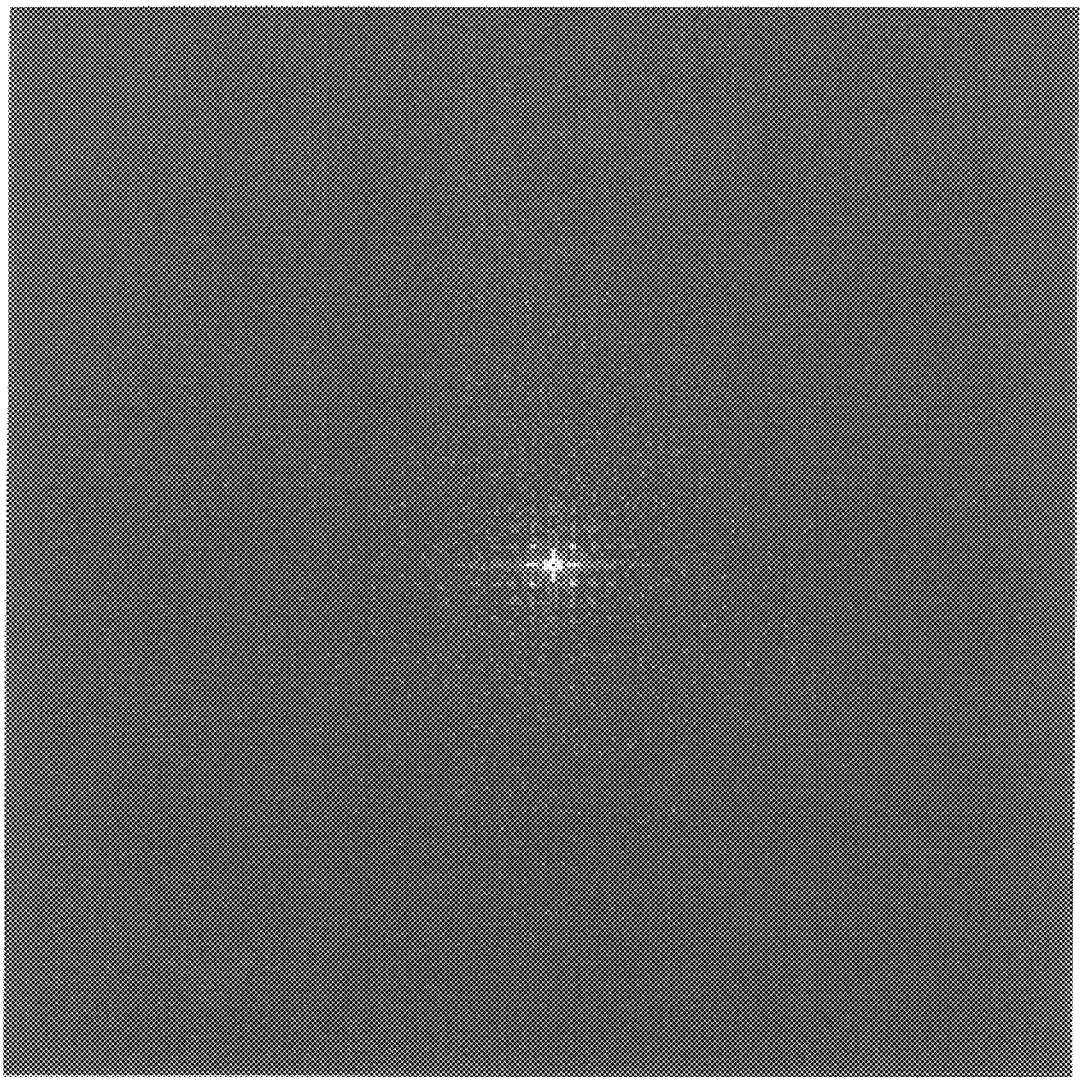
FIG. 7(A) shows an FFT amplitude spectrum of the image shown in FIG. 6(A)
Figure 7B:
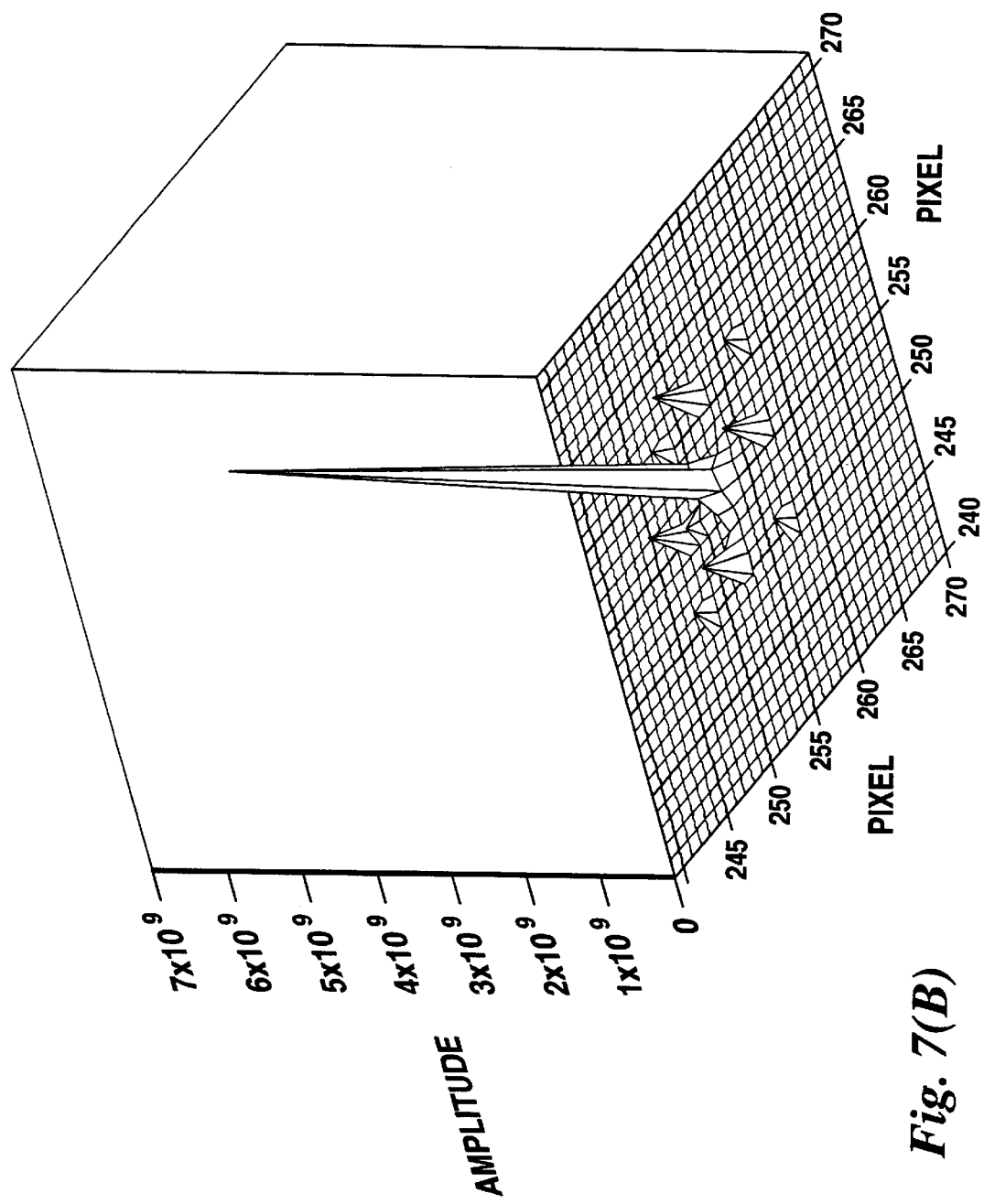
FIG. 7(B) contains a 3-D projection of the FFT spectrum after 10% truncation.

The next step is to calculate a DFT of the image—and its associated power spectrum—using formulae introduced previously. The frequency spectrum of the image in FIG. 6(A) is illustrated in FIGS. 7(A) and 7(B). As is well known to those skilled in the art, the coefficients which result from a Fourier transform of image data represent the power in the data of each spatial frequency. Note that most of the information in the original image is concentrated in the low spatial frequency region which is situated by convention at the center of the diagram in these two views.

The higher frequency components (which might be due to pixel noise, etc.) can now be eliminated by filtering, or truncating, the DFT. In the preferred embodiment, the degree is controlled by selecting a parameter which varies between 0% and 100%, with a value of 100% meaning that no filtering takes place and a value of 0% indicating that the entire DFT has been set equal to zero. Intermediate values represent the proportion of spatial frequencies retained in the analysis. Additional filtering, such as removal of the central/dc component of the DFT, can be applied at this point, if that is desired.

Figure 8A:
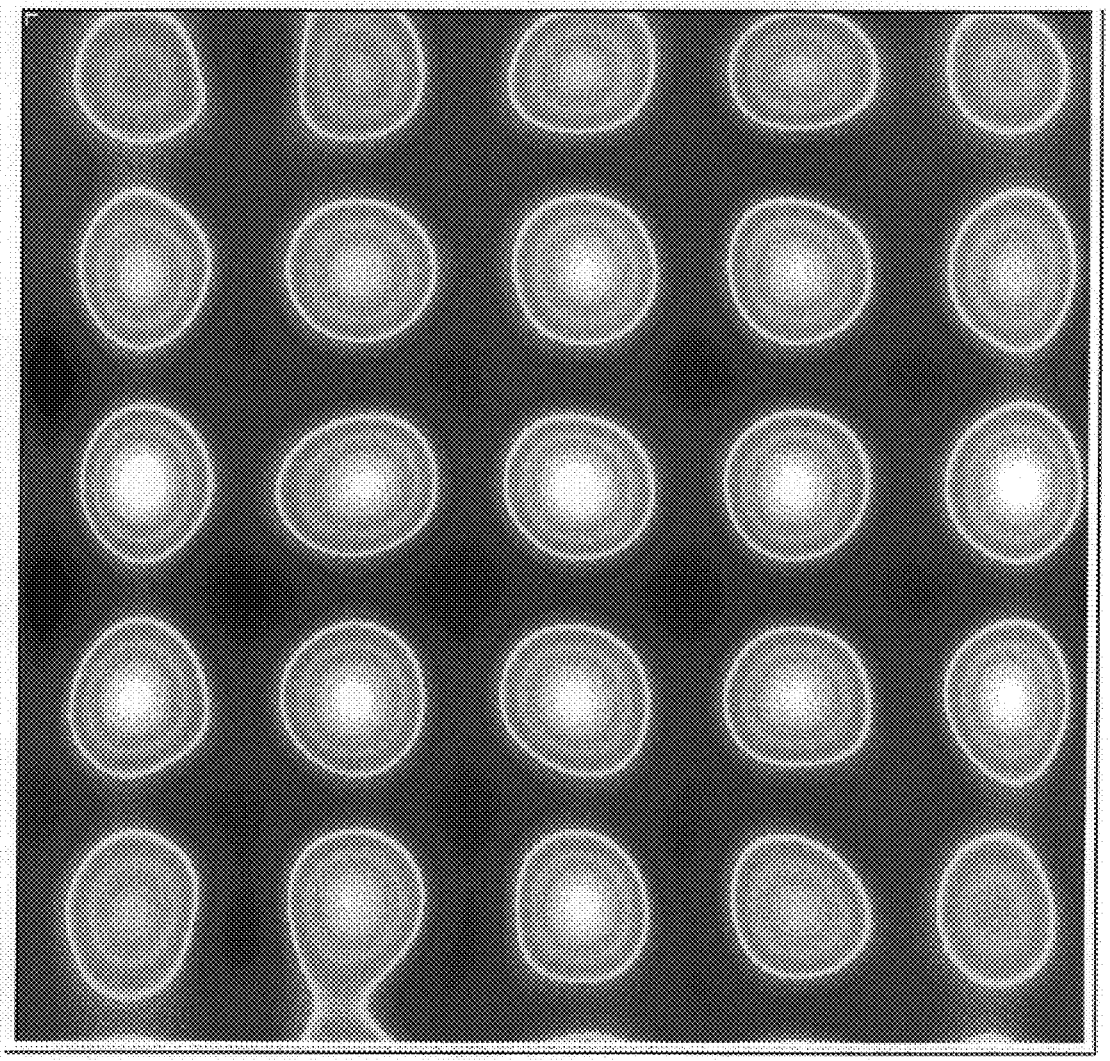
FIG. 8(A) shows an inverse DFT of the amplitude spectrum shown in FIG. 7, which reconstructs the filtered original image; and, FIG. 8(B) contains a 3-D projection of that same image.
Figure 8B:
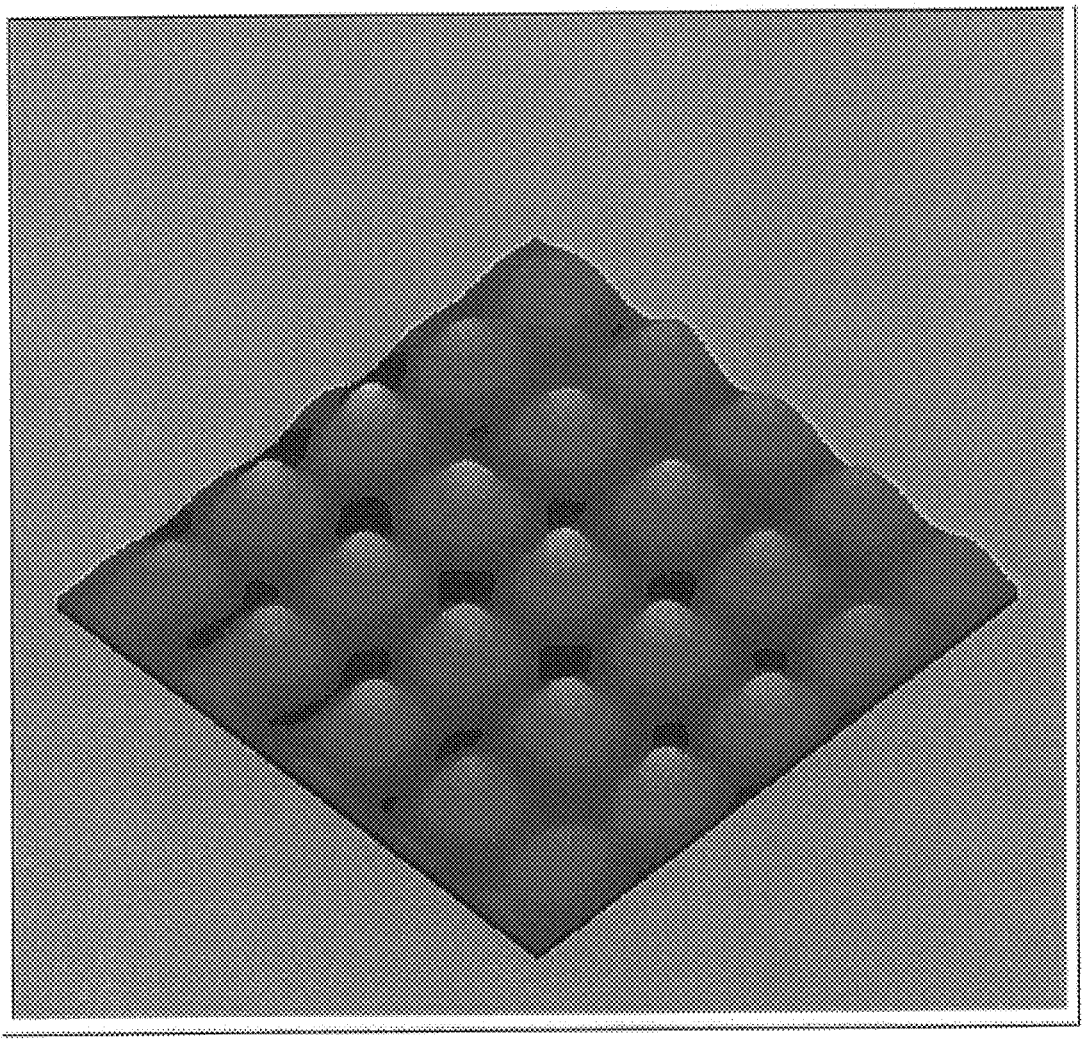

An inverse DFT is now performed and the filtered original image is thereby reconstructed (FIGS. 8(A) and 8(B)). This image is available for visual review.

Figure 9:
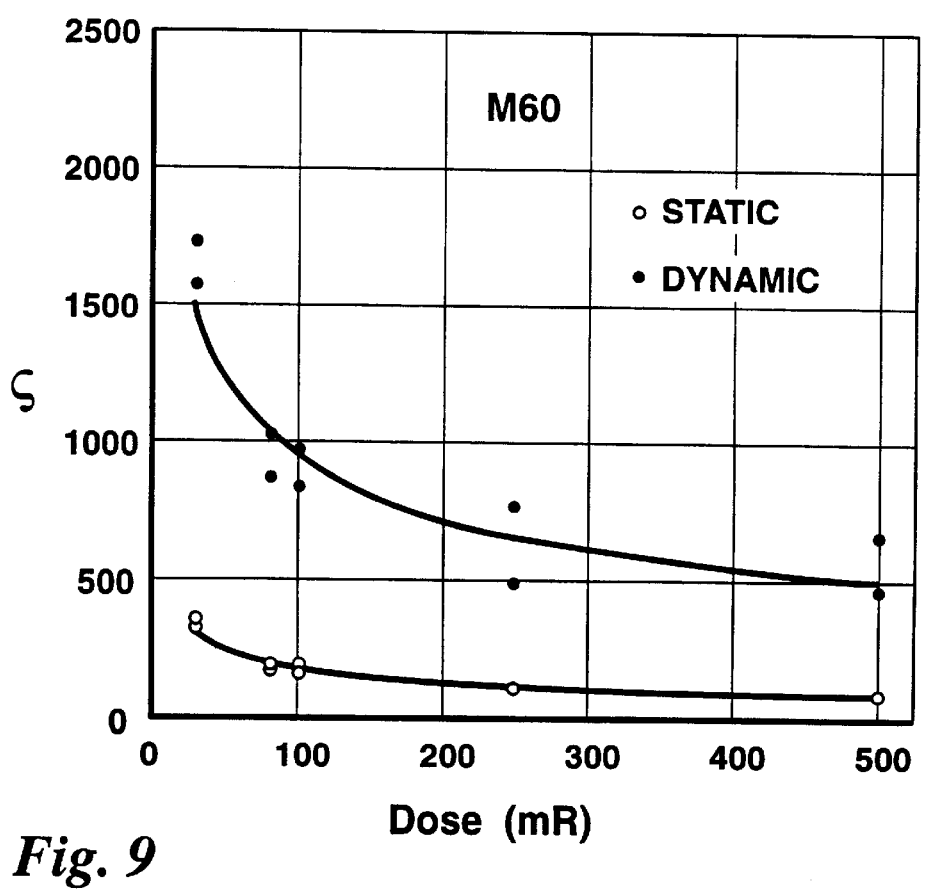
FIG. 9 shows values of $\xi$ for a variety of doses under static and two-directional dynamic irradiation with 60 keV x-rays.

The shape parameter $\xi$, was evaluated for images obtained under differing conditions of irradiation, including different doses, different energies, and static versus dynamic conditions. In general, the lowest value of $\xi$ is obtained with the "static" irradiation case, and the highest value is obtained with the "2-directional dynamic" irradiation case. The "1-directional dynamic" case, where the sample was rotated about one axis only, yielded intermediate values for $\xi$. A summary of the $\xi$ values calculated from the images obtained under the static and two-directional dynamic configurations is shown in FIG. 9 as a function of x-ray dose (in mR) for 60 keV x-rays.

Analysis has shown that the value of the shape parameter $\xi$ is dependent upon dose and radiation energy, and upon the details of the chosen radiation filter pattern (hole diameter, spacing, shape, etc.). It is important to note, however, that these analyses indicate that $\xi$ still preserves the ordering indicated in FIG. 9, namely that a lower value of $\xi$ is obtained for static irradiation cases as compared with dynamic irradiation cases. Generally speaking, single-valued cut-off values for $\xi$ that separate static and dynamic irradiation cannot be given, but rather a "discrimination function" will need to be determined for the particular filter type, radiation energy, dose, and optical system under consideration.

Experiments have suggested one preferred discrimination function that can be used to distinguish between values of $\xi$ arising from static versus dynamic irradiations. That function takes the general form:

$$\xi_{discr}=AD^B,$$

where A and B are constants that depend upon the details of the optical system being used (including magnification, etc.). Values of $\xi > \xi_{discr}$ at dose D indicate dynamic irradiation, whereas $\xi < \xi_{discr}$ at dose D indicates static irradiation. The previous expression and associated inequalities are true—independent of energy—up to a limiting energy, $E_1$. The particular value of $E_1$ is dependent upon the filter material and the filter thickness, with heavier material (e.g., lead instead of copper) and thicker filters causing $E_1$ to increase to higher values of energy. For the examples show herein (1 mm thick copper) $E_1 \approx 150$ keV.

Although the experiments discussed previously and much of the general discussion elsewhere contains references to the use of POSL as a means of producing a radiation exposure-dependent image from the luminescent material 20, this language was chosen for purposes of specificity only, rather than out of any intention to so-limit the method of determining whether an image is a result of static or dynamic exposure. In more particular, POSL, continuous stimulation, and thermoluminescence, etc., may all be used to create the image (and, optionally, the flat-field image) that is subsequently analyzed by the instant methods. The essential feature of the methods disclosed herein is that they operate on a luminescent image of a previously irradiated sample, wherein the amount of emitted light at each point is representative of the radiation dosage at that point.

Finally, although the instant invention is described as using the DFT as part of the image processing embodiment, those skilled in the art will realize that the Fourier Transform is just one of many spatial transforms that might be used. In particular, the Fourier Sine and Cosine Transforms, the Hartley Transform, Walsh Transforms, and various Wavelet transforms are some of the many transforms that could be used instead. Thus, in the claims that follow, "DFT" will be taken to represent more than just the Discrete Fourier Transform: it will be used to generally represent any orthonormal-basis transform that produces transform coefficients.

While the inventive device has been described and illustrated herein by reference t o certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

BIBLIOGRAPHY

The documents that are listed hereinafter are specifically incorporated by reference into this patent application.

1. G. W. Luckey Apparatus and Method for Producing Images Corresponding to Patterns of High Energy Radiation. U.S. Pat. No. 3,859,527. Jan. 7, 1975.
2. M. Ikedo, Y. Yasuno, and T. Yamashita, Device for Storage and Display of a Radiation Image, U.S. Pat. No. 3,975,637. Aug. 17, 1976.
3. N. Kotera, S. Eguchi, J. Miyahara, S. Matsumoto, and H. Kato, Method of and Apparatus for Reading Out a Radiation Image Recorded in a Stimulable Phosphor. U.S. Pat. No. 4,258,264. Mar.24, 1981.
4. H. Kato, M. Ishida and S. Matsumoto, Method and Apparatus for Processing a Radiation Image. U.S. Pat. No. 4,315,318. Feb. 9, 1982.
5. J. Gasiot, P. F. Braunlich and J-P. Fillard, Method and Apparatus for Real-Time Radiation Imaging. U.S. Pat. No. 4,517,463. May 14, 1985.

What is claimed is:

1. A method of radiation field imaging for determining a spatial dose distribution in a luminescent detector, wherein said luminescent detector consists of at least a layer of luminescent material, and wherein said luminescent material is capable of storing an absorbed radiation dose image, comprising:
    (a) irradiating said luminescent detector through an absorbing filter, thereby creating a stored dose pattern within said luminescent material,
        (a1) said absorbing filter having higher radiation absorption regions and lower radiation absorption regions, and,
        (a2) said higher and lower radiation absorption regions together forming a spatially periodic pattern;
    (b) inducing at least one luminescence emission from said luminescent material, said at least one luminescence emission being representative of said stored dose pattern; and,
    (c) analyzing at least one of said at least one luminescence emissions to determine an estimate of said spatial dose distribution.

2. A method according to claim 1, wherein step (c) includes the steps of:
    (c1) forming 2-D digital representations of selected ones of said at least one luminescence emissions, and
    (c2) numerically processing said 2-D digital representations of said selected luminescence emissions to determine an estimate of said spatial dose distribution.

3. The method of claim 1 wherein:
    said absorbing filter is composed of a material selected from the group consisting of copper, brass, lead, gold, stainless steel, metal, ceramics, or plastic.

4. A method according to claim 1, wherein step (b) includes the steps of:
    (b1) illuminating for a predetermined period of time at least a portion of said luminescent material with a laser light, said laser light operating
        at a predetermined wavelength, and
        at a predetermined power level,
        thereby inducing a luminescence emission in said at least a portion of said luminescent material so illuminated, and,
    (b2) performing step (b1) a predetermined number of times at a predetermined illumination repetition rate, thereby inducing at least one luminescence emission.

5. A method according to claim 4 wherein said luminescence material has a luminescence lifetime, and wherein said illumination predetermined period of time is shorter than said luminescence lifetime.

6. A method according to claim 4, wherein
said laser light is obtained from a Nd:YAG laser with a second harmonic generation at about 532 nm,
said illumination predetermined period of time is between 1 ns and about 10,000 ns, and
said predetermined illumination repetition rate is between 1 Hz and about 30,000 Hz.

7. A method according to claim 4, wherein step (c) includes the steps of:
(c1) forming a 2-D digital representation of at least one of said at least one luminescence emissions,
(c2) calculating a composite image from any 2-D digital representations so formed, and,
(c3) numerically analyzing said composite image to determine an estimate of said spatial dose distribution.

8. The method of claim 7 wherein step (c3) includes the steps of:
(i) calculating a discrete 2-D Fourier transform of said composite image, thereby forming a 2-D Fourier transformed image,
(ii) defining a frequency domain filter,
(iii) applying said frequency domain filter to said 2-D Fourier transformed image, thereby creating a filtered 2-D Fourier transformed image, and,
(iv) calculating a shape parameter from said filtered 2-D Fourier transformed image, said shape parameter being representative of said spatial dose distribution.

9. The method of claim 8, wherein step (iv) includes the step of calculating said shape parameter according to the formula:

$$\xi = \frac{\sum_{n_1=1}^{N}\sum_{m_1=1}^{M}|F(n_1,m_1)W(n_1,m_1)|}{\max_{n_1,m_1}\{|F(n_1,m_1)W(n_1,m_1)|\}}$$

where $\xi$ is said shape parameter, N and M are horizontal dimensions of said 2-D Fourier transformed image, Max($\cdot$) represents a maximum of a function of over an indicated range, $|x|$ represents a complex magnitude of an argument, $F(n_1,m_1)$ is said 2-D Fourier transformed image, and $W(n_1,m_1)$ is said defined frequency domain filter.

10. The method of claim 8, wherein step (i) includes the steps of
(1) irradiating a control luminescent layer,
(2) inducing at least one control luminescence emission from said irradiated control luminescent layer,
(3) obtaining a digital representation of at least one of said at least one control luminescence emissions, thereby producing a flat-field image,
(4) normalizing said composite image by said flat-field image, thereby obtaining a normalize d composite image, and
(5) calculating a 2-D Fourier transform from said normalized composite image, thereby producing a 2-D Fourier transformed image.

11. The method of claim 8, wherein the step of irradiating said luminescent detector through an absorbing filter, includes the further step of
(a1) irradiating said luminescent detector through an absorbing filter until a particular dose level is reached.

12. The method of claim 11, further comprising the steps of:
(v) comparing said calculated shape parameter with a predetermined value to determine whether said spatial dose distribution is more characteristic of a static pattern of irradiation or a dynamic pattern of irradiation,
wherein said predetermined value is determined according to the following equation $$\xi_{discr} = AD^B$$

where $\xi_{discr}$ is said predetermined value, A and B are constants, and D is numerical value representative of said particular dose level.

13. A method according to claim 1, wherein said luminescent material
includes more than two chemical elements,
has a plurality of lattice defects, whereby said absorbed radiation dose image may be stored, and
has a radiation-induced absorption within an optical range of stimulation.

14. A method according to claim 13, wherein said luminescence material
is a crystalline, anion-deficient aluminum oxide containing carbon,
has an F-center concentration of about $10^{16}$–$10^{18}$ cm$^{-3}$ which exhibits optical absorption at about 205 nm,
has an F$^+$-center concentration of about $10^{15}$–$10^{17}$ cm$^{-3}$ which exhibits optical absorption at about 255 nm, and
has a luminescence lifetime of about 35 ms.

15. A luminescent detector for the detection of radiation exposure, wherein is provided a source of irradiation, comprising:
(a) a luminescent material; and,
(b) a radiation filter proximate to said luminescent material and positioned between the source of irradiation and said luminescent material, said radiation filter containing a spatially periodic pattern of low radiation absorption coefficient regions.

16. A luminescent detector according to claim 15, further comprising:
(c) an upper retaining member; and,
(d) a lower retaining member,
wherein said luminescent material is positioned between said upper and said lower retaining members.

17. A luminescent detector according to claim 15, further comprising:
(c) a substrate, wherein said luminescent material is deposited on said substrate.

18. A luminescent detector according to claim 15, wherein said regions of low radiation absorption coefficient are apertures passing through said radiation filter.

19. A luminescent detector according to claim 15, wherein said regions of low radiation absorption are circularly shaped regions.

20. A luminescent detector according to claim 15, wherein said regions of low radiation absorption coefficient are square-shaped regions.

21. A luminescent detector according to claim 15, wherein spatially periodic pattern of low radiation absorption coefficient regions is one-dimensionally periodic.

22. A luminescent detector according to claim 15, wherein spatially periodic pattern of low radiation absorption coefficient regions is two-dimensionally periodic.

23. A luminescent detector according to claim 15, wherein said filter is composed of a material selected from the group consisting of copper, brass, lead, gold, stainless steel, metal, ceramics, or plastic.

24. A luminescent detector according to claim 15, wherein said luminescent detector is a dosimeter.

25. A system for the imaging of a radiation field, comprising:

(a) an optical stimulation source;

(b) an irradiated luminescent detector, said luminescent detector having been irradiated through a spatially periodic absorbing filter, and said luminescent detector luminescing when exposed to said optical stimulation source, thereby creating a luminescent signal, said luminescent signal representative of said radiation field; and, (c) a photodetector, said photodetector sensing a spatial distribution of said luminescent signal, and converting said sensed spatial distribution of said luminescence signal into an electronic signal representative of said radiation field.

\* \* \* \* \*